United States Patent [19]
Adas et al.

[11] Patent Number: 5,569,475
[45] Date of Patent: Oct. 29, 1996

[54] INSULATOR FOR THERMOPLASTIC MOLDING NOZZLE ASSEMBLY

[75] Inventors: James O. Adas, Clinton Twp.; Fred W. Schroeder, Utica; Fred Steil, Warren, all of Mich.

[73] Assignee: D-M-E Company, Madison Heights, Mich.

[21] Appl. No.: 343,681

[22] Filed: Nov. 22, 1994

Related U.S. Application Data

[63] Continuation-in-part of Ser. No. 75,045, Jun. 10, 1993, abandoned.

[51] Int. Cl.$^6$ .............................. B29B 11/06; B05D 7/00
[52] U.S. Cl. .................. 425/549; 425/556; 425/566; 427/421; 427/422; 427/404; 427/419.7
[58] Field of Search .................. 427/421, 422, 427/404, 419.7; 425/549, 556, 566

[56] References Cited

U.S. PATENT DOCUMENTS

| | | | |
|---|---|---|---|
| 4,222,733 | 10/1980 | Gellert et al. | 43/107 |
| 4,268,241 | 1/1981 | Rees et al. | 425/549 |
| 4,635,851 | 1/1987 | Zecman | 239/135 |
| 4,642,043 | 1/1987 | Schwarzkopf | 425/143 |
| 4,648,833 | 3/1987 | Yamada | 425/549 |
| 4,894,197 | 1/1990 | Tsutsumi | 264/297.2 |
| 5,046,942 | 9/1991 | Gellert | 425/549 |
| 5,061,174 | 10/1991 | Gellert | 425/549 |

*Primary Examiner*—Shrive Beck
*Assistant Examiner*—David M. Maiorana
*Attorney, Agent, or Firm*—Wolf, Greenfield & Sacks P.C.

[57] ABSTRACT

In a thermal plastic molding device, a thermal insulator is provided between the nozzle assembly and the surrounding plates. Preferably, the insulator is a ceramic material, such as zirconia oxide, which is sprayed on in a thin coating, preferably in the range of 0.007–0.012 inches. Alternatively, other nonmetallic coatings can be used, or the insulator can be provided as a ring around the nozzle assembly instead of as a coating. A coating can be applied either to the plate or to the nozzle assembly. A protective coating, preferably a metal, is sprayed or plated over the ceramic insulator.

22 Claims, 3 Drawing Sheets

INSULATOR FOR THERMOPLASTIC MOLDING NOZZLE ASSEMBLY

CROSS-REFERENCE TO RELATED APPLICATION

This application is a continuation-in-part of U.S. Ser. No. 08/075,045, filed Jun. 10, 1993 now abandoned, which is expressly incorporated by reference.

FIELD OF THE INVENTION

This invention relates to a thermoplastic molding device.

BACKGROUND OF THE INVENTION

Injection molding devices are used to make a wide variety of molded plastic items, such as containers or toys. In one type of device, for example, solid thermoplastic pellets are stored in a hopper. From the hopper, the pellets are conveyed through a passage by a screw which pushes the pellets in an augering motion. The motion of the screw and heaters positioned around the passage melting the pellets into a molten plastic resin that is injected through a manifold into one or more nozzle assemblies. Nozzle assemblies are available in different shapes, sizes, and configurations, but typically have an elongated body with a flow passage having a receiving end facing the manifold for receiving the molten plastic resin, and an outlet end with a gate opening which has a centered, tapered tip therein. This tip is sometimes referred to as a "needle." A heating element is provided near the passage in the nozzle assembly to help maintain the resin flow.

The plastic resin enters the flow passage from the receiving end, and flows to the gate opening at the tip, and then into a cavity. The cavity in the mold is filled when the screw is turned to a specified amount and then the resin is injected into the cavity. The molded plastic object is allowed to cool. The mold is opened and ejector pins in the mold are used to eject the molded plastic object.

The nozzle assembly is positioned within an opening in a mold which includes a nozzle plate and/or a cavity plate. Each of these plates may be cooled by a water line, so there is a thermal difference at points of contact between the nozzle assembly and the opening. It is desirable to maintain the heat at a specific temperature on the resin within the nozzle assembly, and not to lose too much heat to the opening through the contact points. The heating element, in some embodiments, is positioned around a portion of the nozzle body and is separated from the nozzle plate and the cavity plate by air which serves as an acceptable thermal insulator.

The nozzle body may directly contact the opening in the mold, for example, at the nozzle plate at one location, and at the cavity plate at a seal-off area. The nozzle assembly may contact the nozzle plate to provide support within the opening, and may contact the cavity plate at the seal-off to prevent resin from leaking into the heater area. It is desirable to keep the heat on the resin within the nozzle assembly, and not to lose too much heat to the housing where the nozzle assembly and the housing are in contact.

An attempt has been made to insulate the nozzle assembly from the opening in the cavity plate by pressing a titanium ring over the nozzle assembly at the seal-off area. While titanium has fairly good heat insulating properties (about 12 btu/ft hr °F.), it is rather soft when subjected to the operating temperatures and pressures. When the titanium softens, it can deform so that resin can escape from the seal-off area.

SUMMARY OF THE INVENTION

The present invention features an injection molding device which comprises a mold having an opening, and a nozzle assembly within the opening. The nozzle assembly receives a resin and channels the resin to a cavity in the mold. A thermal insulator, preferably made from a ceramic material, separates the mold and the nozzle assembly to substantially prevent physical and thermal contact.

In preferred embodiments, the insulator is a thermally insulating coating which is applied to a portion of the exterior surface of the nozzle assembly, or to a portion of the mold where the nozzle assembly has contact. The coating preferably includes ceramic, and more particularly, zirconia oxide. The coating can be sprayed on to a thickness of 0.001 inches to 0.250 inches, and is preferably 0.007 inches to 0.012 inches for zirconia oxide. Alternatively, the insulator can be a ceramic or other non-metallic ring.

A protective coating is preferably applied over the insulating coating. The protective coating is made from a wear resistant material and preferably includes a metal, such as titanium, nickel, or molybdenum. The protective coating is preferably applied in thin layer by spraying or electroless plating. The layer is then machined to a desired thickness, which is defined by the space between the nozzle assembly and the mold when the nozzle assembly is inserted. The overall thickness of the insulating coating and protective coating is preferably within about 0.001 inches thick of a desired thickness if the coatings are used at a seal off area to keep in resin. The overall thickness of the thermally insulating coating and the protective coating is typically about 0.020–0.030 inches.

In another aspect, a non-metallic thermal insulator having a softening point greater than the maximum operating temperature of the nozzle assembly separates a portion of the nozzle assembly and a portion of the mold. The maximum temperature can vary depending on the type of thermoplastic, but can reach over 800° F.

In another aspect, the invention features a method for insulating a portion of a mold from a portion of a nozzle assembly in a thermoplastic device. The method includes the step of providing a coating of a thermally insulating material on the portion of the nozzle assembly. An undercoat may be first provided to improve bonding of the insulator and the nozzle assembly.

The method preferably further includes a step of applying a protective coating over the thermally insulating material, preferably by spraying or plating a metal, such as nickel, titanium, or molybdenum. The method further includes a step of machining the protective coating to obtain a desired thickness.

In another aspect, the invention features a method comprising the step of providing a ceramic material between the portion of the nozzle assembly and the portion of the mold. The ceramic may be applied as a coating on either the assembly or in the opening in the mold, or as a ring between the assembly and the mold.

The insulator could, alternatively, be formed in a mold as a solid ring and glued onto the nozzle with high temperature adhesive. A second ring of protective, wear resistant material, preferably including a metal, is positioned concentrically over the insulator and bonded to it with the high temperature adhesive.

BRIEF DESCRIPTION OF DRAWINGS

Other objects, features, and advantages will become apparent from the following description of the preferred embodiments and from the appended claims when read in conjunction with the following drawings in which:

DESCRIPTION OF THE PREFERRED EMBODIMENTS

Figure 1:
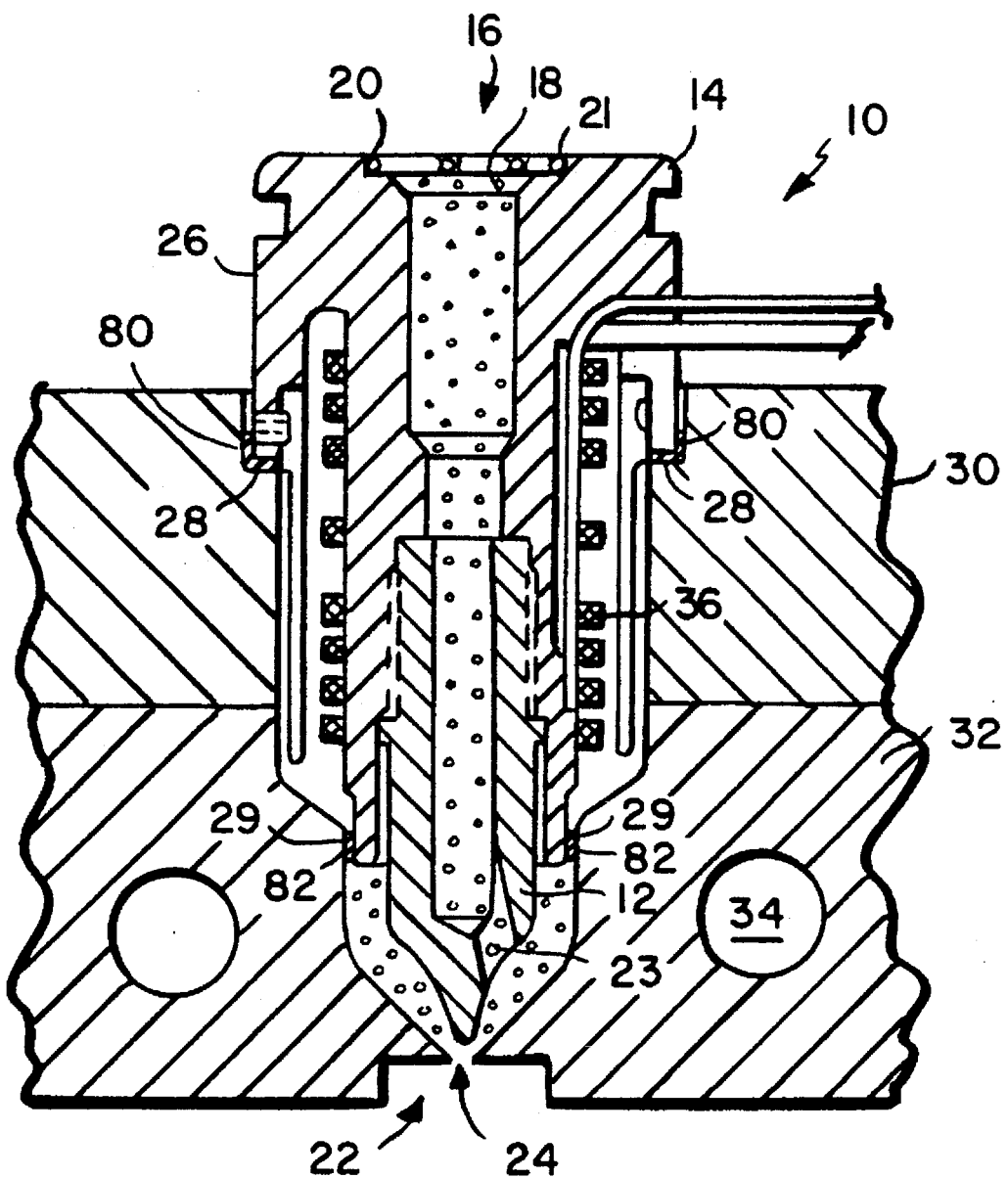
FIG. 1 is a cross-sectional view of a nozzle assembly with insulation accordingly to the present invention.

Referring to FIG. 1, in a first embodiment of the present invention, a nozzle assembly 10 for an injection molding system includes a threaded tip 12 which is screwed into a steel nozzle body 14 at a lower end of the nozzle body. Nozzle body 14 and tip 12 each have a central passage 16 through which molten plastic resin 18 flows. Resin 18 may be provided through a manifold (not shown) or through an injection molding machining nozzle into a bushing for a single application, and into an upper end 20 of passage 16 which is sealed with a seal ring 21 when using a manifold. The resin flows through the passage in the nozzle body and the tip. At the lower end of the central passage, the resin flows through angled hole passages 23, and into a cavity 22 through a gate opening 24. A molded object (not shown) is provided at cavity 22, and is pulled away from the tip after it is filled, packed, and cooled. The gate opening typically ranges from about 0.030 inches to 0.250 inches for different molded plastic objects.

Nozzle body 14 is surrounded by a nozzle plate 30 and a cavity plate 32 which are parts of a mold which has an opening to receive the nozzle assembly. A circumferential flange 26 at the upper end of the nozzle assembly rests on a shoulder 28 of nozzle plate 30. At a lower portion of nozzle body 14, a cavity plate 32 abuts nozzle plate 30 and is coupled with screws (not shown). A water line 34 cools the cavity plate, and another water line (not shown) cools the nozzle plate. Around a portion of the nozzle body and around the threaded portion of tip 12, a heating coil 36 is wrapped. Coil 36 provides heat to help keep the resin melted so that it flows through passage 20.

Nozzle assembly 14 comes into direct contact with nozzle plate 30 at shoulder 28, and with cavity plate 32 at a seal-off portion 29. At each of these contacting locations, a thermal insulator 80, 82 is provided. The thermal insulator is preferably a ceramic insulator, such as zirconia oxide, which is preferably provided in a thin layer sprayed onto the opening in the plate or the nozzle body. The insulator is preferably sprayed on the nozzle body rather than the housing because it is typically more convenient. The insulator may have a thickness of 0.001 inches to 0.250 inches, and preferably ranges from 0.007 inches to 0.012 inches for a sprayed-on layer of zirconia oxide on a steel nozzle assembly. This preferred range is thick enough to have an insulating effect, but not too thick that the insulator cracks when it expands. Zirconia oxide has a thermal conductivity of about 1 btu/ft hr °F.

Alternatively, an insulating ring, also preferably ceramic, can be provided between the nozzle assembly and each of the plates.

Other material which could be used should be good thermal insulators, should not soften below the operating temperature of the nozzle, and should have a coefficient of expansion similar to that of the nozzle assembly. For example, both steel and zirconia oxide have a coefficient of thermal expansion of about $63 \times 10^{-7}$/°F. in. (but note that the coefficient varies with temperature). If the nozzle assembly is made from a different material or operates at a different temperature, another material may be selected accordingly as the insulator.

Figure 4:
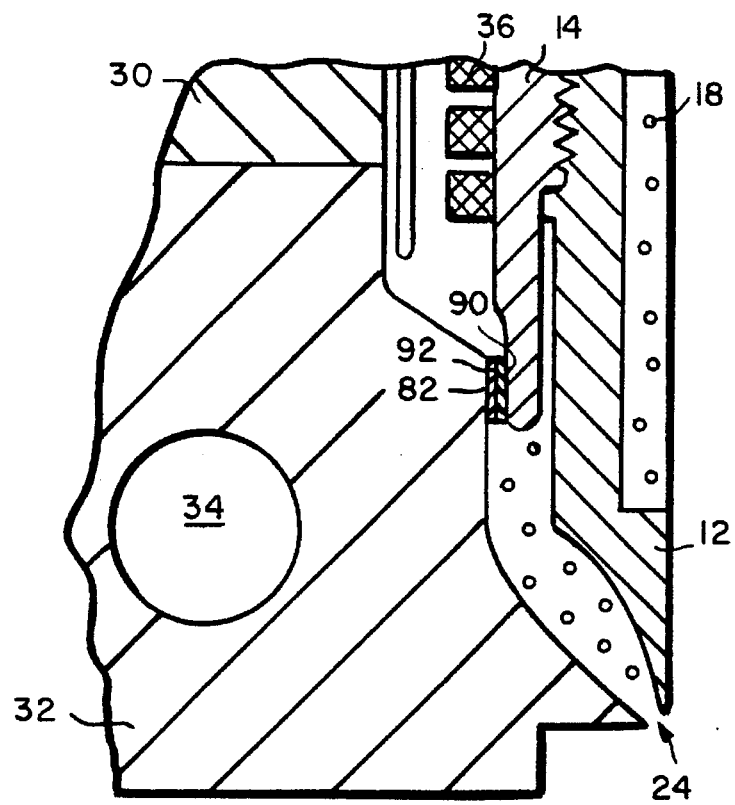
FIG. 4 is a close-up cross-sectional view of the insulating layer and undercoat layer.

Referring to FIG. 4, if a spray-on coating is used, nozzle body 14 can be roughened first and an undercoat 90 can be first applied to the body to assist with bonding. The coating 92 is then sprayed over the undercoat, and is finished to a desired thickness. The undercoat can be, for example, a nickel aluminum about 0.001–0.003 inches thick for the application of zirconia oxide as discussed above.

Figure 2:
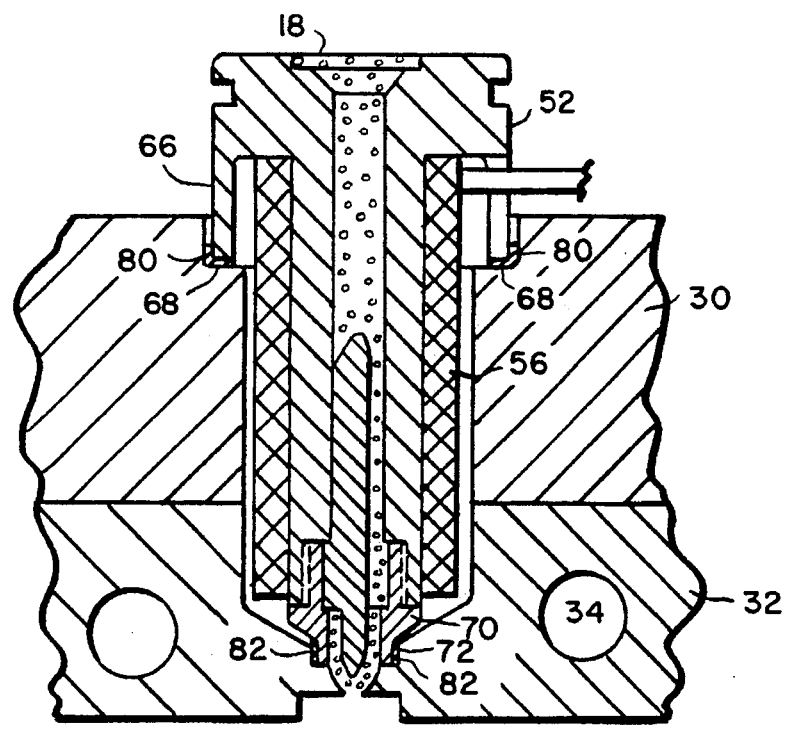
FIGS. 2 and 3 are a cross-sectional view, and a close up cross-sectional view, respectively, of an insulator for a nozzle assembly according to a second embodiment of the present invention.
Figure 3:
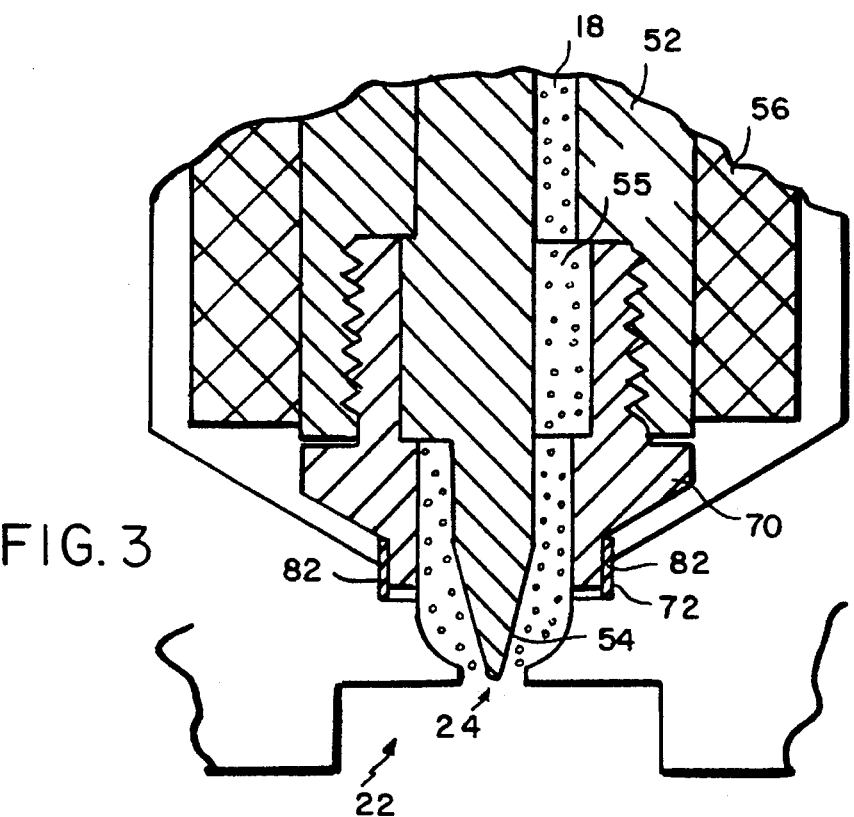

Referring to FIGS. 2 and 3, in a second embodiment, resin 18 flows through a passageway in a nozzle body 52 and a tip 54 (sometimes called a needle in this type of device). The nozzle assembly is heated with a heater 56. Other components, such as nozzle plate 30 and cavity plate 32, are generally similar to the embodiment shown in FIG. 1. Resin 18 enters the nozzle assembly at an upper end of nozzle body 52 and flows downward through the passageway in nozzle body 52, through a passage 55 at tip 54, and through gate 24 with diameter of about 0.028 inches to 0.080 inches into cavity 22. The tip is about 0.010 inches in diameter at the lower most portion.

Insulators 80, 82 are provided at shoulder 68 and at portion 72, respectively, in a manner described above. Preferably, the insulating barriers are thin, sprayed-on coatings of ceramic, preferably zirconia oxide. As an alternative, the insulator could be provided as a ring which is pressed over the tip assembly 70 at circumferential portion 72. Other materials which may be used should preferably have a softening point of greater than the operating temperature of the nozzle, and should expand at a similar rate as the nozzle expands.

A thin, spray-on layer of ceramic, such as zirconia oxide, provides good insulating characteristics with a thin layer while maintaining its shape under pressure. Moreover, it does not soften under the high temperatures involved in thermoplastic molding.

Since the shoulder insulator 80 does not seal a liquid, it could possibly be constructed to have gaps or holes to space the nozzle assembly from the nozzle plate. For example, a split ring, a ring with holes, or a spray-on layer could be applied on a portion of the nozzle assembly, although this might be more difficult than making a solid ring, or spraying the entire area.

Figure 5:
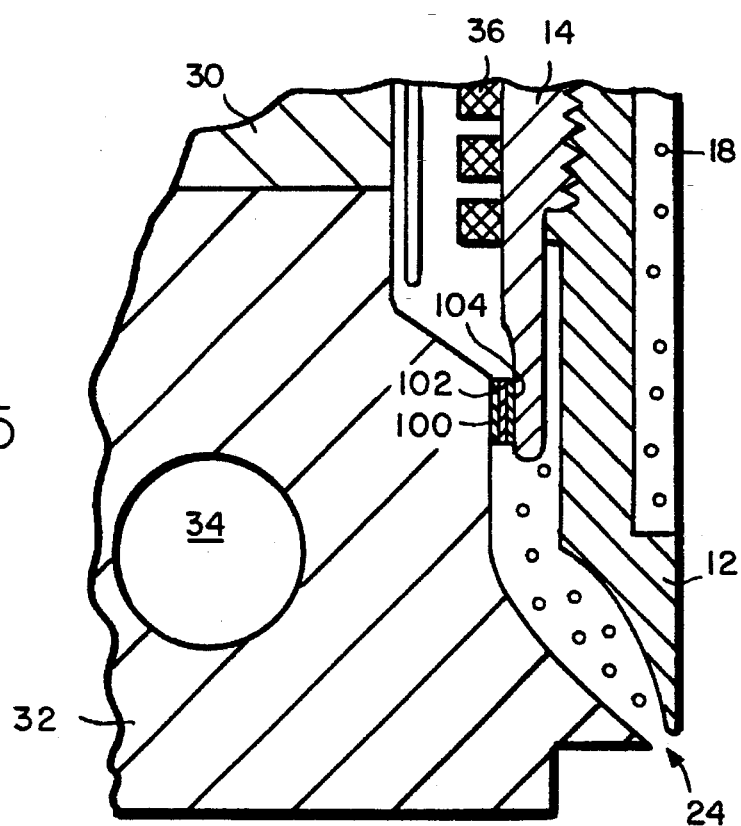
FIG. 5 is a close-up cross-sectional view of the insulating layer, undercoat layer, and a protective layer.

Referring to FIG. 5, an insulating coating 102 is applied over an undercoat 104 in a similar manner as in FIG. 4, i.e., preferably by spraying. A protective coating 100 is applied over the outside of the insulating coating so that when the nozzle assembly is inserted in the mold, the protective coating contacts the mold. This protective coating is preferably made of a wear resistant and machinable material, preferably a metal that can be applied in a thin layer and then ground to a desired thickness, such as titanium, nickel, or molybdenum. One example of such a protective coating is a molybdenum product known as "TZM", a trademark of Climax Specialty, Cleveland, Ohio. The protective coating should be sufficiently hard to protect the insulating coating when the nozzle is inserted in the mold, or in case the nozzle is dropped or otherwise impacted, but it should not have good heat transfer. Therefore, copper, for example, would not generally be desirable unless it could be treated to satisfy these criteria.

The material for the protective coating may be applied as a liquid with a plasma sprayer so that the material forms around and hardens on the insulating coating as a thin shell. The protective coating can also be formed like a shell with electroless plating, particularly if nickel is used. The protective layer is preferably applied so that the combined thickness of the protective layer and insulating layer is greater than a desired finished thickness. The protective layer is then ground so that the protective coating has a thickness of at least about 0.009 inches. After machining, the overall thickness of the coatings is typically about 0.020–0.030 inches. When the coatings are applied at a portion of the nozzle assembly at a seal off area, they have a desired thickness, which is defined by the space between the mold and the nozzle assembly, within a tolerance of about 0.001 inches to form a liquid seal. While the protective coating can serve some insulating function and should not have good heat transfer, the protective coating is primarily for protecting the insulator, e.g., from damage or from flaking.

Other non-metal materials, such as tungsten carbide, could be used for a protective coating. While this material is very strong, it does have drawbacks, however, in that it can be difficult to machine.

Alternatively, a protective layer can be formed as a ring in a mold and then is applied by bonding with a high temperature resistant adhesive to the insulating layer.

Having now described a number of embodiments of the present invention, it should become apparent to those skilled in the art that numerous other embodiments and modifications are contemplated as falling within the scope of the present invention as defined by the appended claims. The insulator has been described in terms of a typical example of a surrounding environment, and in terms of particular types of products. It should be appreciated, however, that dimensions and other parameters such as temperature, can vary depending on the materials used, the product to be made, the operating temperature, and the type of molding device. A protective coating as shown in FIG. 5 can be used, for example, also over insulating layers in other types of nozzle assemblies, such as that shown in FIGS. 2–3.

What is claimed is:

1. A thermoplastic molding device comprising:
   a mold having an opening;
   a nozzle assembly within the opening, the nozzle assembly for receiving resin and for channeling resin to a cavity;
   a thermal insulator formed as a layer on at least one of the nozzle assembly and mold for thermally insulating the mold and the nozzle assembly said insulator being formed only for the portions of contact therebetween; and
   a protective layer formed over the thermal insulator.

2. The device of claim 1, wherein the insulator includes a solid ring.

3. The device of claim 1, wherein the insulator includes a ceramic.

4. The device of claim 3, wherein the protective layer consists of a metal applied on the insulator.

5. The device of claim 1, wherein the insulator comprises a sprayed-on coating on a surface of one of the nozzle assembly and the mold.

6. The device of claim 1, wherein the protective layer is primarily made of a material selected from a group consisting of nickel, molybdenum, titanium, and tungsten carbide.

7. A method for thermally insulating a nozzle assembly for use in a mold in a thermoplastic molding device, the method comprising the steps of:
   spraying a thermally insulating material to an exterior surface of the nozzle assembly to form a insulating coating for only portions of the nozzle assembly where the nozzle assembly contacts the mold when the nozzle assembly is inserted in the mold; and
   providing a protective coating over the insulating coating.

8. The method of claim 7, the method further comprising a step, prior to the spraying step, of providing an undercoat that assists the thermally insulating material in bonding to the exterior surface.

9. The method of claim 7, wherein the spraying step includes spraying the insulating material to a thickness of about 0.007 inches to 0.012 inches.

10. The method of claim 7, wherein the spraying step includes spraying a ceramic material as the thermally insulating material to the portions of the exterior surface.

11. The method of claim 7, wherein the step of providing a protective coating includes plating a metal over the insulating coating.

12. The method of claim 7, wherein the step of providing a protective coating includes spraying a metal over the insulating coating.

13. The method of claim 7, wherein the step of providing a protective coating includes providing a material selected from a group consisting of nickel, molybdenum, titanium, and tungsten carbide.

14. The method of claim 7, wherein the step of providing a protective coating includes providing the protective coating so that the combined thickness of the insulating coating and the protective coating exceeds a desired total coating thickness, the method further including the step of machining the protective coating so that the combined thickness of the insulating coating and the protective coating is about said desired thickness.

15. A method for insulating a portion of a mold from a portion of a nozzle assembly in a thermoplastic molding device comprising the steps of:
   providing a thermally insulating layer for only the portion of one of the mold and the nozzle assembly where the nozzle assembly contacts the mold; and
   providing a protective layer over the thermally insulating material so that, when the nozzle assembly is inserted in a mold, the protective layer contacts the other of the mold and nozzle assembly.

16. The method of claim 15, wherein the method further comprises, prior to the step of providing a thermally insulating layer, the steps of:
   roughening the surface of the portion; and
   applying an undercoat to the portion, the undercoat for assisting in bonding.

17. The method of claim 16, wherein the step of providing a thermally insulating layer includes providing a ceramic material as the thermally insulating layer.

18. The method of claim 15, wherein the step of applying a protective layer includes spraying a protective material over the thermally insulating layer.

19. The method of claim 15, wherein the step of applying a protective layer includes plating a protective material over the thermally insulating layer.

20. The method of claim 15, wherein the nozzle assembly has an elongated housing having lengthwise sides, a first opening for receiving resin at a first end of the housing, a second opening for providing the resin to a cavity in a mold at a second end of the housing, and a flange extending from the first end of the housing, the flange for contacting the mold at a point of contact and for preventing movement of the nozzle assembly in at least one direction relative to the mold and, wherein the step of providing a thermally insulating layer includes providing an insulating layer on one of the mold and nozzle assembly at the point of contact.

21. The method of claim 15, wherein the nozzle and the mold define a region that resin fills in, the region being bounded by a seal off area that prevents resin from escaping the region, wherein the step of providing a thermally insulating layer includes providing the thermally insulating layer at the seal off area.

22. A method for insulating a nozzle assembly from a mold, wherein the nozzle assembly has an elongated housing having lengthwise sides, a first opening for receiving resin at a first end of the housing, a second opening for providing the resin to a cavity in a mold at a second end of the housing, and a flange extending from the first end of the housing, the flange for contacting the mold at a point of contact and for preventing movement of the nozzle assembly in at least one direction relative to the mold and, the method including the step of providing a thermally insulating layer on one of the mold and nozzle assembly at the point of contact.

* * * * *